United States Patent
Siljeström et al.

(10) Patent No.: US 7,239,535 B2
(45) Date of Patent: Jul. 3, 2007

(54) VOLTAGE SOURCE CONVERTER

(75) Inventors: Roland Siljeström, Grängesberg (SE); Lars Döfnäs, Ludvika (SE); Ying Jiang-Häfner, Ludvika (SE)

(73) Assignee: ABB Technology Ltd., Zürich (CH)

( * ) Notice: Subject to any disclaimer, the term of this patent is extended or adjusted under 35 U.S.C. 154(b) by 344 days.

(21) Appl. No.: 10/929,409

(22) Filed: Aug. 31, 2004

(65) Prior Publication Data

US 2006/0044849 A1 Mar. 2, 2006

(51) Int. Cl.
*H02M 1/12* (2006.01)

(52) U.S. Cl. .......................... 363/41; 363/98; 363/132

(58) Field of Classification Search ................ 363/17, 363/40, 41, 98, 131, 132
See application file for complete search history.

(56) References Cited

U.S. PATENT DOCUMENTS

| 5,990,724 | A | 11/1999 | Bijlenga et al. |
| 5,991,176 | A | 11/1999 | Saada et al. |
| 6,535,402 | B1 | 3/2003 | Ying et al. |
| 2004/0037097 | A1* | 2/2004 | Deng et al. ................ 363/41 |

* cited by examiner

*Primary Examiner*—Jessica Han
(74) *Attorney, Agent, or Firm*—Venable LLP; Eric J. Franklin

(57) ABSTRACT

An apparatus for controlling a voltage source converter with at least two bridges of semiconducting self commutating elements connected in anti-parallel with a diode, including circuitry for producing a switching control pulse train to form a fundamental frequency, circuitry for effecting a switching order and circuitry for detecting a switching event.

13 Claims, 6 Drawing Sheets a b

VOLTAGE SOURCE CONVERTER

TECHNICAL FIELD

The present invention relates to a voltage source converter (VSC) containing a plurality of self-commutating semiconducting elements. More precisely the invention relates to a method and an apparatus for controlling a VSC by a modulation signal, such as a pulse width modulation (PWM) signal. In particular the invention concerns a VSC comprising a plurality of series connected semiconducting elements and especially a converter station of a high voltage direct current (HVDC) transmission line comprising such a VSC.

The PWM controlled converter in this description includes an inverter as well as a rectifier. Such converter may be used in a low power applications such as motor drive systems, as well as in high power applications such as high voltage direct current (HVDC) transmission systems and static var compensation (STACOM) systems.

BACKGROUND OF THE INVENTION

A converter, and more precisely a voltage source converter provides the electrical coupling between a DC voltage system and an AC voltage system comprising one or a plurality of phases. Depending on the power direction, a converter has either the function of a rectifier, which delivers electric power from the AC system to the DC system, or an inverter, which delivers electric power from the DC system to the AC system. By way of example, a converter may be used for variable-speed control of a synchronous or asynchronous rotating machine as well as transmission of high voltage direct current (HVDC) over long distances.

The simplest converter comprises a two level bridge composed of two valves. Each valve comprises a single or a plurality of switches. A three phase converter thus comprises a bridge with six valves where each valve comprises at least one switch. A switch comprises a turn-off device and a diode in antiparallel connection therewith. By this arrangement the current is controllable stopped in one direction but freely passing in the opposite direction. For high voltage applications each valve comprises a plurality of series connected switches with such turn-off devices and antiparallel diodes.

Since the load is of the inductive type, it is necessary for a diode referred to as a "free-wheeling diode" to be placed in parallel with the switch in order to allow the load current to flow when the corresponding switch is open. A further development of the two level converter is the three level converter which requires six extra diodes. This converter is also known as a neutral point clamped (NPC) converter bridge.

Using one bridge of a two-level converter as an example the AC output voltage of a converter, the amplitude, the phase angle and the frequency of the fundamental frequency as well as the harmonic distortion, is controlled by alternatively switching on and off the two valves on the bridge connected to the same phase. Thereby, the AC current is controlled as desired. The pulse signals for controlling the switches are generated according to a selected Pulse Width Modulation (PWM) method.

There are a large variety of PWM methods. Most often used methods are carrier based PWM, such as Sinusoidal Pulse Width Modulation, SPWM, and carrierless PWM, such as Optimum Pulse Width Modulation, OPWM. The modulation techniques in the prior art are based on the assumption that the switching elements of the converter operate in an ideal manner, that is, they switch on or off exactly at the instants the control dictates. These are reckoned as ideal switching instants in the following text. In reality, however, the converter output voltage waveform deviates from what the control originally dictated.

A first reason is that the switching devices are not ideal. A switching device has a delayed reaction to its control signal at a turn-on and a turn-off switching respectively. The delayed reaction depends on the type of semiconductor, on its current and voltage rating, on the controlling waveforms at the gate electrode, on the device temperature, and in particularly on the actual current to be switched.

A second reason is the blanking time, or "dead time", which must be inserted between an opening (turn-off) order of a first valve and a closing (turn-on) order of a second valve on the same bridge. The presence of a blanking time is causing the two valves of a converter bridge never to be closed at the same time in order to prevent a short-circuit.

A third reason which contributes to the deformation of the output voltage is the difference in the rising and descending rate, dv/dt, of the voltage across the switch devices during turn-off and turn-on. This may be due to the existence of a snubber circuit or parasitic capacitance in the diodes. The deformation is noticeable in particular when the switching current is low.

According to the reasons mentioned there will be a delay between the switching order and the actual switching event. In order to achieve an actual switching event that correspond to the ideal switching instant the switching order must be sent in advance. Thus for every switching there must be taken into consideration an action time of the valve. The action time of a valve is in the following text defined as the time difference between the actual switching order and its actual switching event. Thus the action time comprises the delayed reaction of the switching device, the blanking time and the variation due to the low rising and descending rate of the voltage (dv/dt). The consequence of the variation of these parameters is giving rise to an non-linear error between the commanded voltage and the real converter output voltage. This results not only in additional low order of harmonics, for instance, $5^{th}$ and $7^{th}$ harmonics, but sometimes also in instability problems of the control system. Therefore, there have been many attempts made to correct or to compensate these errors.

From U.S. Pat. No. 5,991,176 a method for processing PWM waves and a device therefore is previously known. The object of the method is to reduce or eliminate the effect of the blanking time (referred as dead time) in an inverter or a controlled rectifier. The known inverter is controlled by a modulator and a discriminator. The role of the modulator is to create a set wave, whereas the discriminator makes it possible to split this wave into a plurality of waves which are intended for individually controlling the various switches. The purpose of the discriminator is to introduce a delay on the closing of the corresponding switches, so that it is always certain that, when the command to close one switch is given, the opposite switch is already open.

The known method suggest the use of two corrected control set signals, one for the case when the current is an output current and one for the case when the current is an input current. It is the direction of the current in the load which will determine whether one or the other of the two corrected set signals is to be used. Thus the switching order is compensated for the blanking time.

From U.S. Pat. No. 6,535,402 a method for adaptive compensation of dead time for an inverter and a converter is previously known. The object of the method is to compensate the effect of the dead time to avoid current distortion and torque ripple in motors driven by such an inverter. The document appreciates the difficulty to measure the zero crossing of the current and thus propose a bias current applied on the distorted current. Then it is established when the current passes the bias level of the current. A second dead time compensation is derived from the current crossing of the bias level and added to a first dead time compensation of a PWM signal.

The known methods for correcting the error between the commanded voltage and the real output voltage in the prior art are based on current measurements. Thus the known methods are based on measurement of current switching. A feed-forward type compensation is provided which corrects only the average voltage error due to the blanking time or low dv/dt. The error due to the reaction time of the switching devices is not considered. There is no feedback control or confirmation to tell if the turn-on or turn-off of the switching devices occur at the exact instant that control dictates. In addition, the method described in U.S. Pat. No. 6,535,402 requires additional hardware components, which can be very costly in high power application.

The methods known from the prior art may work well enough in some conditions. In other conditions they may fail to function properly. One such case is when the switching frequency is low and the inductance is also low, which may result in a very high current ripple. Typically in high power applications of STATCOM and HVDC the converters are directly connected to the grid. In such situations they will have high switching current ripple. It is obvious in such a case that the current direction is different from one switching instant to a next switching instant.

It may be possible to use a predicted the current at the next switching instant to estimate the action time for next switching in advance. However, it is very difficult to guarantee the correctness of the predicted current, as the correctness of the predicted current relies not only on the converter reference voltage, on the accuracy of measured current and measured voltage, but also on the calculation speed of the control process.

In high power applications, such as HVDC and STATCOM, the low order harmonics lead to very high cost for filtering apparatus. Thus, there is a need for a new control method, which can realize high precision switching thereby eliminates the effect of errors mentioned above, for voltage source converters in high power application.

SUMMARY OF THE INVENTION

A primary object of the present invention is to provide a method and an apparatus for controlling a voltage source converter by which the precision of the switching control is raised and the influence of the errors discussed is minimized. A second object of the invention is to provide a method and an apparatus that eliminates the low order harmonics, for instance, $5^{th}$ and $7^{th}$ harmonics, and the instability problem in the system control. A further object is to determine the action time of a valve with high precision. Yet a further object is to provide a method suitable for converters with high current ripple, such as in high power application in a power system, as well as for converters with low current ripple, such as in drive systems and other applications. Still a further object is to provide a method that requires no additional hardware and which is independent on whether information from current measurement or voltage measurement is used.

These objects are achieved by an apparatus, by a method, or by a computer program according to the present invention.

According to the invention the actual switching event is detected and by a comparison of the ideal switching instant and the detected actual switching event the action time is adjusted. The time of the ideal switching instant is subtracted from the time of the actual switching event and added to the present action time to form an adjusted action time. Thus if the calculated difference is positive the action time is increased and if the difference is negative the action time is decreased. If there is no difference between the ideal switching instant and the actual switching event no adjustment of the action time is needed.

A difference in time between the ideal switching instant and the actual switching event from a first pulse may be used to correct the action time for the next pulse. By doing so two major considerations arises. Firstly the performance of the hardware to calculate the difference and the adjustment needed between two adjacent pulses is huge. Secondly the switching condition of the first pulse may not be the same as of the second pulse. Thus the action time could be different and the adjustment may be worse than by just calculating the instant to send the switching order.

According to the invention the adjusted action time for a selected pulse in a first period of the fundamental frequency is used to correct the actual switching order for the same pulse in a following period of the fundamental frequency. Thus the information gained from the first period is used to determine the switching order in a following period. By memorizing the action time for a pulse in a first period of a fundamental frequency there will be plenty of time to calculate the switching order adjustment for the next period of the fundamental frequency. Thus the demand on the hardware performance is reduced. By adjusting the action time of the same pulse in adjacent periods the variation related to the delayed reaction of a component and its working condition is accounted for since the switching condition would be the same for a corresponding pulse in adjacent periods of the fundamental frequency.

According to a first aspect of the invention the objects are achieved by a method for controlling a VSC by a PWM pulse signal comprising an ideal switching instant for each switching pulse, the method including detecting an actual switching event for a selected switching pulse in a first period of the fundamental frequency, adjusting an action time for the selected switching pulse by comparison of the ideal switching instant and the actual switching event, correcting by the adjusted action time a switching order of a corresponding pulse in a following period of the fundamental frequency.

For each corresponding pulse in adjacent periods of the fundamental frequency the working condition is principally the same. The current load is the same and the position in the period is the same. Thus the reaction time for two corresponding pulses in different periods would also be the same. By this adaptive method the uncertainties of the determination of the reaction time of the semiconductor due to the current working condition is self-adjusting. The method is applicable both for steady-state systems but also for variable frequency systems, especially when the variation is slow.

In a preferred embodiment of the invention a mean value of the action time is calculated for each pulse in a period from action times of equivalent pulses in preceding periods. Thus the memorized value is a mean value of the previous value and the new value. The calculation method is either a linear mean value or an exponentially mean value method.

In a further preferred embodiment of the invention the determination of the switching event is evaluated by voltage measurement across the electrodes of the semiconducting element.

By adjusting the actual order instant for each pulse in a period of the fundamental frequency from information of the same pulse in a previous period the voltage change on the valve will occur exactly at the moment that the control demanded. The benefit of the present invention is that low order harmonics are reduced to a minimal level. This will highly reduce the cost of filters. Another benefit is that control instability for converters with OPWM is avoided.

In a second aspect of the invention the objects are achieved by a control apparatus providing a pulse width modulation (PWM) signal for controlling the valves of a converter bridge. The control apparatus comprises sensing means for detecting the actual switching event of the semiconductor devices and computer means including memory means for calculating and memorizing the action time for each pulse in a period of the fundamental frequency and for correcting the actual switching order of a corresponding pulse in a following period of the fundamental frequency. The apparatus further comprises signaling means for producing and transferring information between the computer means, detecting means and the semiconducting elements in the converter. In preferred embodiments of the invention the PWM is a carrierless PWM, for instance an optimum pulse width modulation, OPWM, or a carrier based PWM, for instance a sinusoidal pulse width modulation, SPWM.

In a third aspect of the invention these objects are achieved by a computer program product comprising instructions for the apparatus to perform the method of correcting the actual order instant of a pulse in a period of the fundamental frequency by information from an equivalent pulse in a preceding period of the fundamental frequency. The computer program also calculates the action time of each switching pulse.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Figure 1:
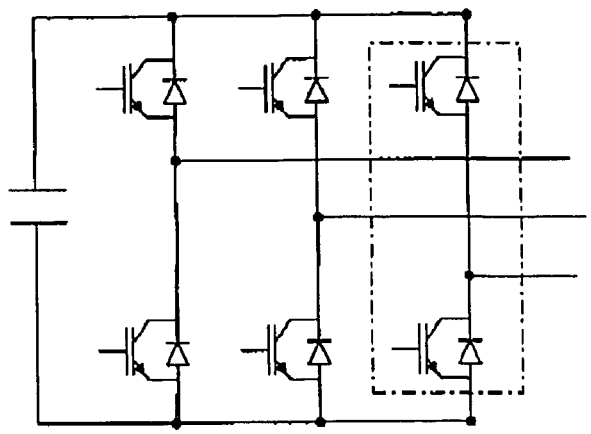
FIG. 1a is graphic representation of a converter.
FIG. 1b is a general representation of a bridge of a two-level converter.
Figure 1:
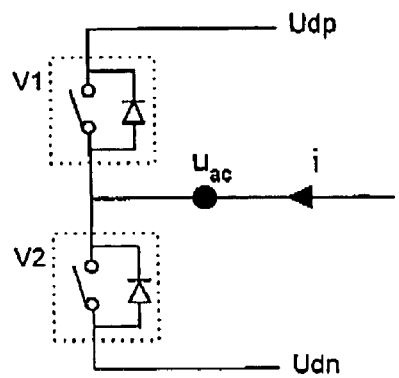

A bridge of a two-level converter is shown as an example in FIG. 1. FIG. 1a represents the full three phase forced commutated bridge and FIG. 1b is a one phase part of the bridge. The bridge part comprises a first valve V1 and a second valve V2 and has a lower DC terminal $U_{dn}$ and an upper DC terminal $U_{dp}$. Each valve comprises at least one switching device containing a self-commutating semiconductor element and a diode element in anti-parallel connection therewith. In the embodiment shown the self-commutating semiconductor element comprises an IGBT. The bridge has an AC terminal $U_{ac}$ i with an AC current i.

Figure 2:
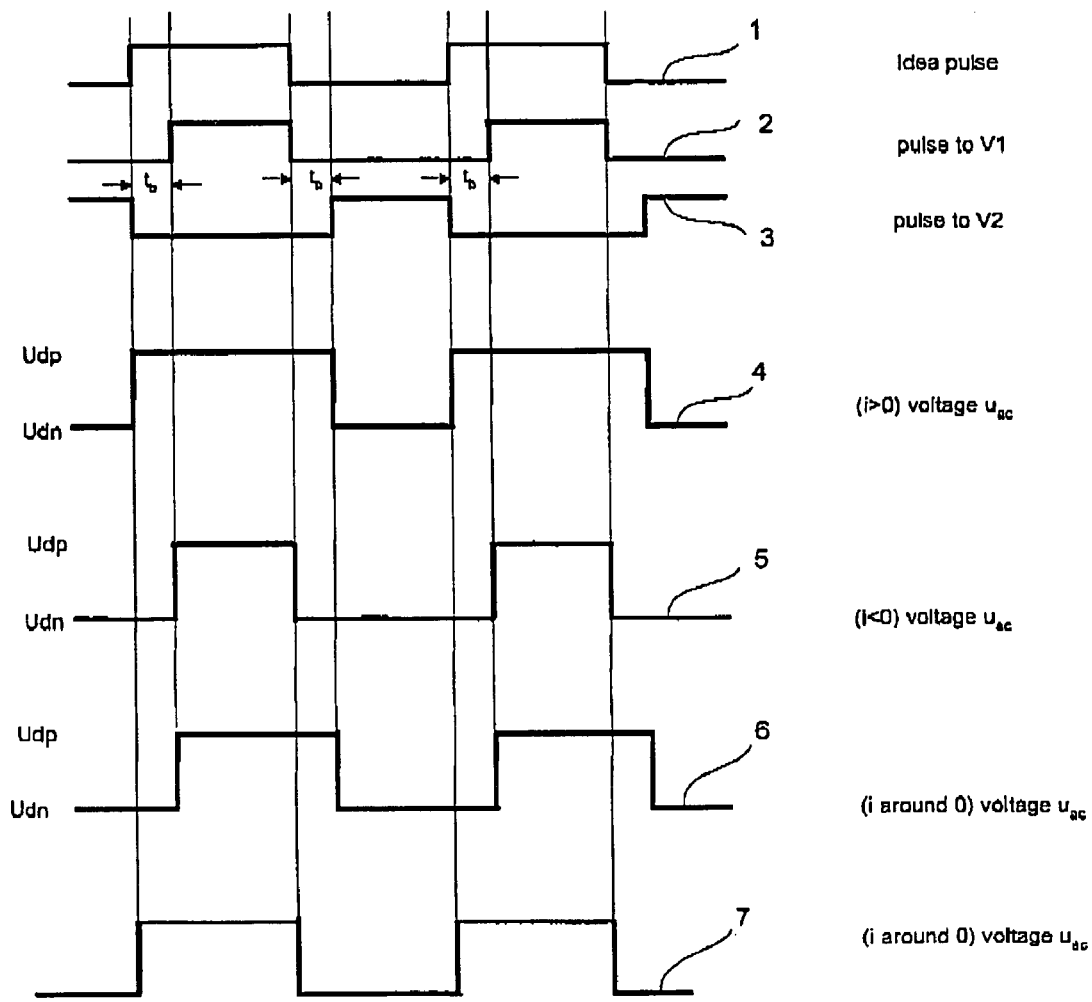
FIG. 2 is a graph showing an ideal pulse, the corresponding pulse to the upper and lower valve and the resulting voltage.

When operating the converter a blanking time, or "dead time", must be inserted between the opening (turn-off) order of the first valve and the closing (turn-on) order of the second valve or vice versa. This is because the two valves of a converter bridge should never be closed at the same time in order to prevent from short-circuit. The effect of the blanking time is illustrated in FIG. 2. The first waveform 1 is the ideal switching pulse. The second waveform 2 is the order pulse to the first valve V1 and the third waveform 3 is the order pulse to the second valve V2. The forth waveform 4 is the resulting voltage $U_{ac}$. The blanking times are denoted $t_b$. It is shown in FIG. 2 that both the phase position and voltage time area, which determines the amplitude, differ from the ideal pulse, that is the commanded output voltage.

As illustrated, a positive current value is defined as an input current. If the current is positive, the IGBT in the second valve V2 and the diode in the first valve V1 will conduct the current. In this case, the current in and the voltage across the second valve V2 will change almost immediately when a turn off order is received by its gate unit. However, when a switching off order is sent to the first valve V1, the current in and the voltage across the first valve V1 will not change. The change of current and voltage on the first valve V1 occurs only when the second valve V2 receives a turn on order. As a result, the voltage at the AC terminal differs from the voltage demanded by the control. This is shown by comparing the waveform of the ideal pulse 1 and the resulting voltage 4 of the AC terminal voltage.

If the current is negative, the diode in the second valve V2 and the IGBT in the first valve V1 will conduct the current. A voltage error will be created when a switching off order is sent to the second valve V2 and the resulted AC terminal voltage will be as shown in fifth waveform 5 in FIG. 2.

When the current amplitude is low, the current direction can be different from one switching event to a next switching event. Then, it is possible that the diodes in both the first valve V1 and the second valve V2 conduct the current during switching off, that is, the current is negative when switching off the first valve V1 and it is changed to positive when switching off the second valve V2. In this case, the AC terminal voltage will be as shown in the sixth waveform 6 in FIG. 2 assuming that the switching devices has an ideal switching behavior. It is also possible that the IGBTs in both the first valve V1 and the second valve V2 conduct the current during switching off. In this condition, the AC terminal voltage will be as shown in the seventh waveform 7 in FIG. 2 assuming that the switching devices had an ideal switching behavior.

Figure 3:
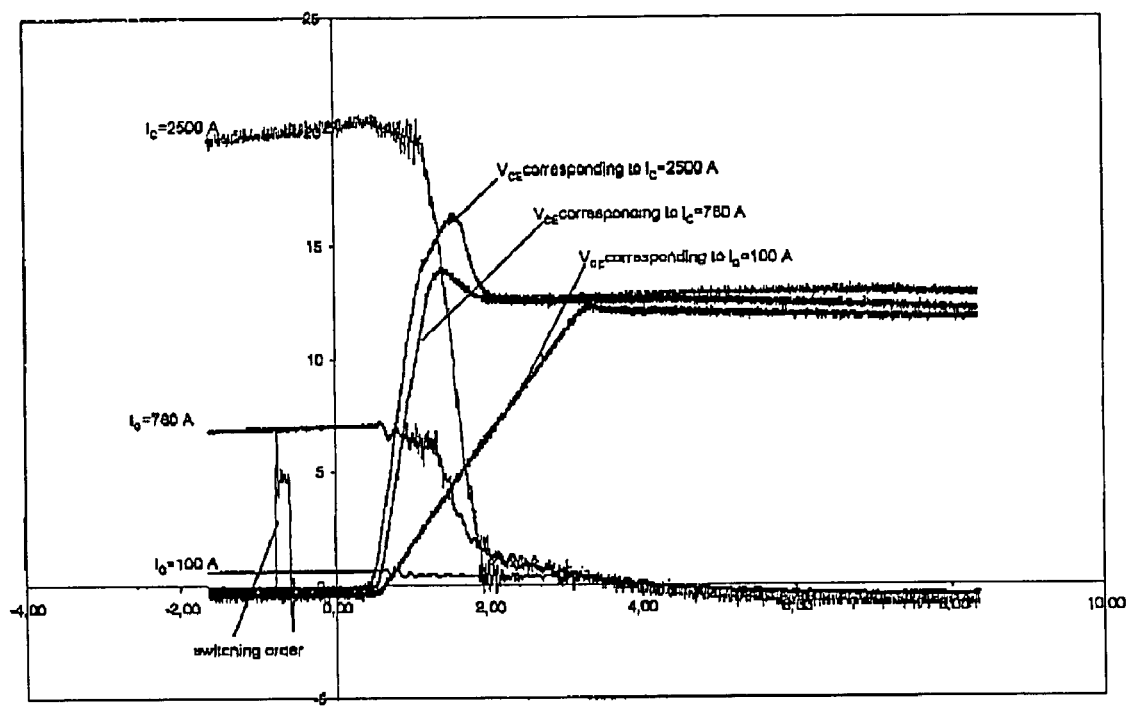
FIG. 3 is a diagram showing different switch off behaviors.

It is thus evident that both the phase position and the voltage time area differ from the control commanded output voltage when the current amplitude is large. If the current amplitude is small, the phase position may be different from the order, but the voltage time area seems to be the same as the control demanded. However, it should be noticed that at turn-off of low currents the voltage increase more slowly than at high currents. As an example, FIG. 3 shows different switching off currents and their corresponding voltages across the valve during the switching off process. The voltage derivate is obviously lower at switching current of 100 A than that at switching current of 2500 A. The low voltage derivate will also contribute a voltage error in comparing with the control commanded voltage.

Figure 4:
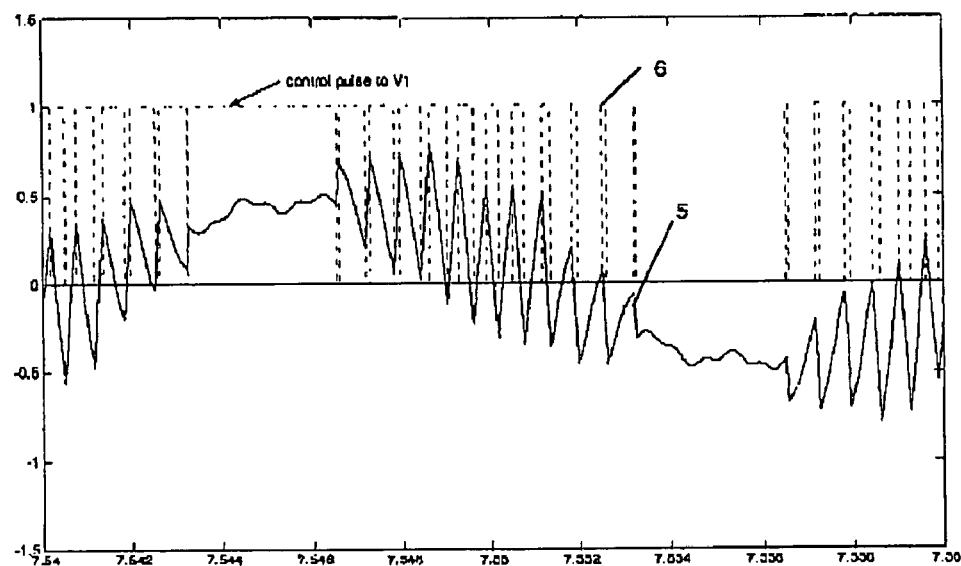
FIG. 4 is a diagram showing current ripple.

The switching is affected by a non-linear behavior of the semiconducting element depending on the switching current. For two adjacent pulses these conditions are seldom the same, in particular for high power applications where the switching frequency is low. Therefore the switching time of a semiconducting element will not be the same for two adjacent pulses. The action time which besides the switching time also include the blanking time is affected accordingly. This means that an adaptive calculation of the action time for a following pulse from information of the previous pulse will not contribute to increase the precision of an effected switching event. In FIG. 4 the current 5 and the pulse signal 6 to the upper valve are plotted against time. It is then obvious that the current direction is different from one switching event to a next switching event.

Figure 5:
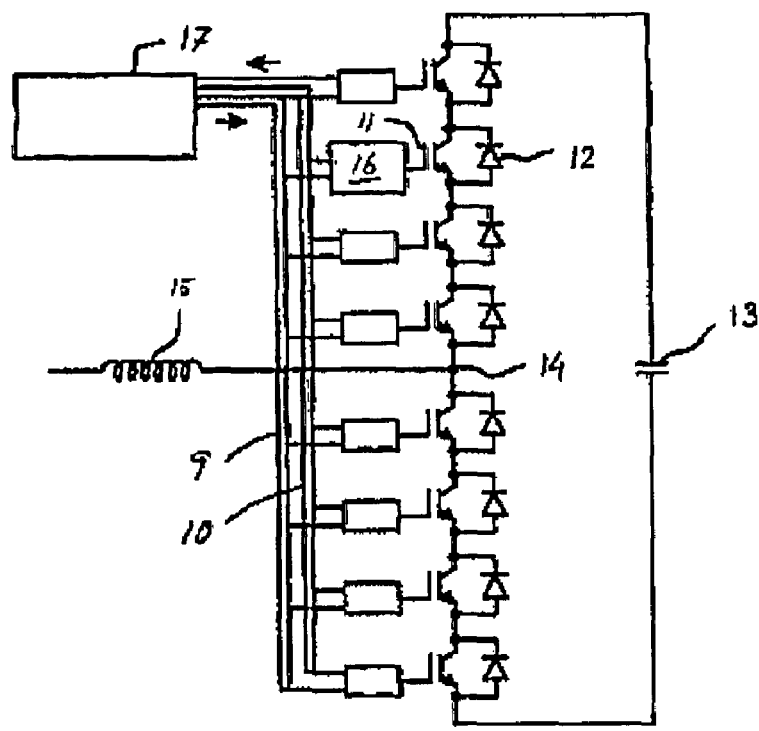
FIG. 5 shows a phase leg of a high voltage converter circuit.

A phase leg of a high voltage converter circuit, to which the present invention is applicable, is schematically shown in FIG. 5. There are normally three phase legs having a DC capacitor 13 in common in a plant connected to a three-phase alternating current network. This comprises in a conventional way, a plurality of power semiconductor devices 11 connected in series, here in the form of IGBTs, and a so-called free-wheeling diode 12 connected in anti-parallel with each such device. The number of power semiconductor devices connected in series is, in practice, considerably higher than indicated in FIG. 5.

The series connection of power semiconductor devices is connected to a DC capacitor 13, while the phase terminal 14 between the power semiconductor devices is connected through a phase reactor 15, for example, a phase of an alternating voltage network. The power semiconductor devices with diodes arranged above the phase terminal 14 in FIG. 5 form an IGBT valve and those located thereunder form another IGBT valve.

All power semiconductor devices in the IGBT valve are turned on simultaneously through signals from a drive unit 16, each schematically indicated, so that the power semi-conductor devices in the first IGBT valve are conducting when a positive potential is desired at the phase terminal 14 and the power semiconductor devices in the second IGBT valve are conducting when a negative potential is desired on the phase terminal 14.

By controlling the power semiconductor devices according to a determined pulse width modulation pattern (PWM), the direct voltage across the DC capacitor 13 may be used for generating a voltage at the phase terminal 14, the fundamental component of which is an alternating voltage having a desired amplitude, frequency and phase position. Such controlling takes place by sending control pulses to the different drive units from a control apparatus 17, which normally takes place through fiber optics. In FIG. 5 there are a first optical fiber 9 and a second redundant optical fiber 10.

The information exchange between the control unit 17 and a drive unit 16 is bi-direction communication via an optical fiber. The switching order is sent from control unit 17 to drive unit 16. The indication signal of the switching event may be sent back from drive unit 16 to control unit 17. The control unit 17, which is located on a low voltage potential, is separated galvanically from the drive unit 16, which is located on a high voltage potential. The indication signal of a switching event is generated in the drive control unit.

Figure 6:
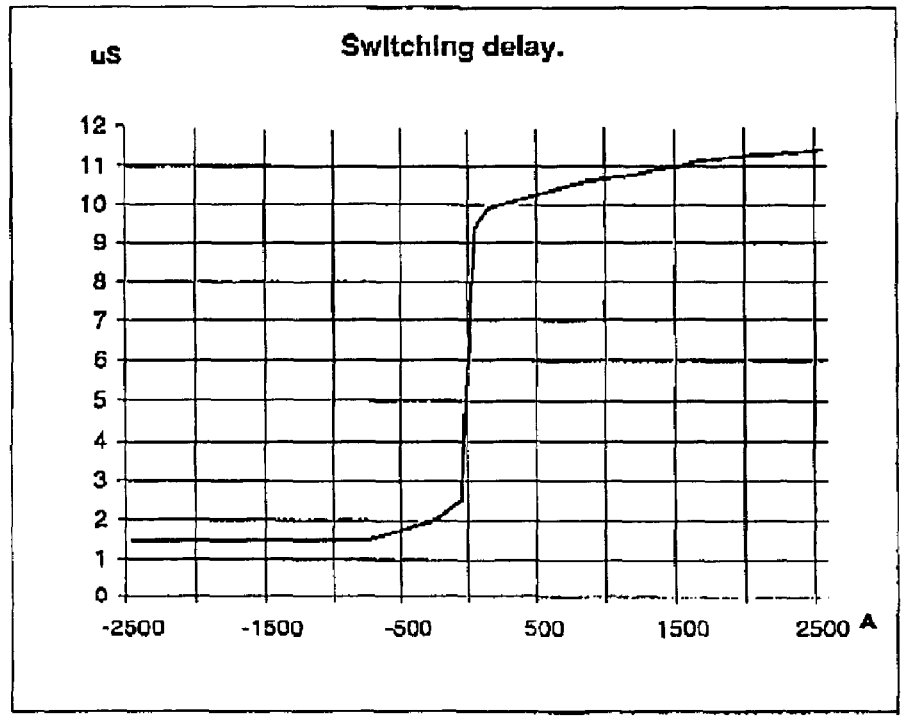
FIG. 6 is diagram showing the delay of the switching event as a function of the current.

There are a plurality of factors affecting the delay from the switch order to the actual switching. The switching devices are not ideal and the switching behavior is highly dependent on the properties of the gate drive units. The switching devices react delay to their control signals at turn-on and turn-off. The delay time depends on the type of semiconductor, on its current and voltage rating, on the controlling waveforms at the gate electrode, on the device temperature, and in particularly on the actual current to be switched. In FIG. 6 the switching delay is shown in dependency of the current.

As showed by FIG. 6 the current direction is the most important parameter. This is because different current directions will determine if the current is flowing in IGBTs or in diodes at the switching instant. As has been discussed previously, a "dead time" or blanking time must be inserted between the turn-off order of the first valve and the turn-on order of the second valve. The blanking time dominates the switching action delay depending on the current.

Due to the delayed reaction of the switching device and the variation in the low rising and descending rate of the voltage (dv/dt), the switching order must be sent in advance to make the actual switching event occur at the ideal switching instant. However if actual switching event does not occur precisely at the ideal switching instant there is a problem of imprecision.

A first consequence this switching imprecision is that it gives additional low order of harmonics, for instance, $5^{th}$ and $7^{th}$ harmonics. A second consequence is that an instability problem may arise in the system control. This is due to a non-linear error between the commanded voltage and the real converter output voltage. According to the invention this non-linear error is eliminated by detecting the actual switching event, evaluating the time difference between the actual switching order and the actual switching event on line and adjusting accordingly the actual switching order of the same pulse in the next period of the fundamental frequency. This functions properly independent of current direction and amplitude.

Figure 7:
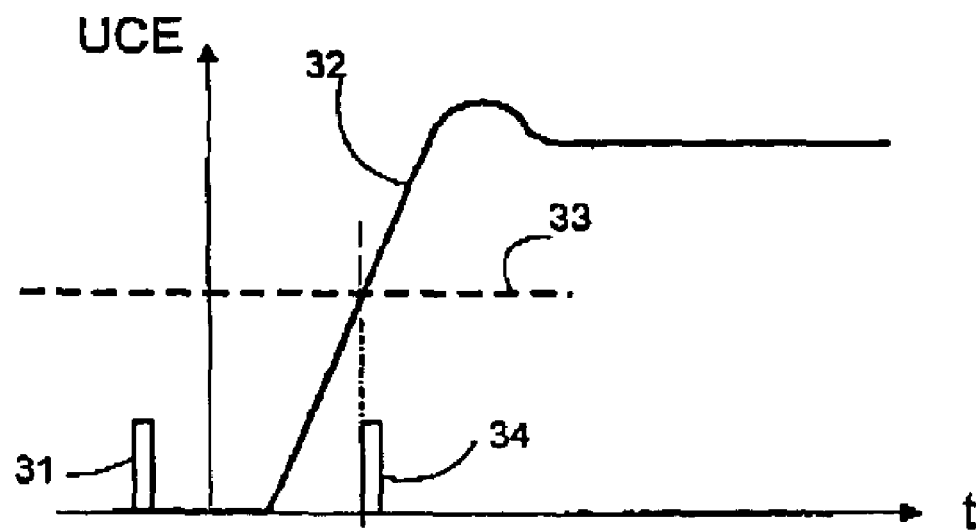
FIG. 7 is diagram of voltage detection of the switching event.

A first way to detect the actual switching event is to use the measured voltage. By using a voltage divider, the magnitude of a voltage across the electrodes of one power semiconductor device in a valve is measured and compared with a pre-determined reference value during the switching off process. As shown in FIG. 7, the moment when measured voltage 32 passes the reference 33 is considered as the event of the actual switching. At the moment of the switching event a signal 34 is generated in the gate control unit of a semiconductor device. The signal is sent back to the valve control to indicate the moment of the actual switching event. In case of the failure of some individual semiconductor device, several of such signals may be sent from different semiconductor devices to their corresponding valve control. In the valve control, the time from sending the switching off order 31 to receiving the indication of actual switching event 34 will be memorized and it will be used in adjusting the corresponding switching off order in the next period of the fundamental frequency.

According to a preferred embodiment, the reference voltage is equal to approximately half of the steady-state voltage during the switching off status.

Figure 8:
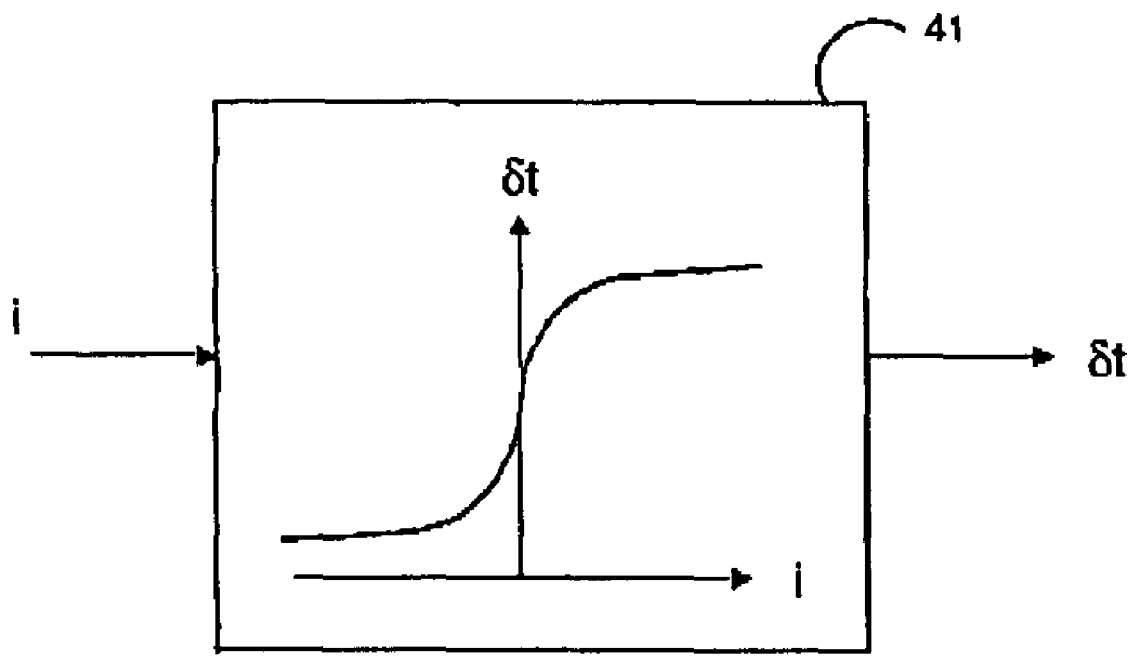
FIG. 8 is diagram of current detection of delay of switching event.

A second way of determining the actual switching event is to use the measured current. The AC current is measured and is already used in the system control and protection. The measured current is sent to the valve control as an input. For a specific type of semiconductor devices with specific gate unit and control, and a given blanking time, the relationship between the switching current and the time delay, which is from the switch off order to actual switching off event, can be obtained via switching testing. FIG. 6 shows as an example the function relationship between the switching current and the time delay. The obtained function is installed either as a table, or an equivalent non-linear function in the valve control process. For each measured switching current, a corresponding time delay can be evaluated by using a table or a non-linear function 41, as shown in FIG. 8. The evaluated time delay for each switching off order will be memorized and it will be used in adjusting the corresponding switching off order in the next period of fundamental frequency.

Figure 9:
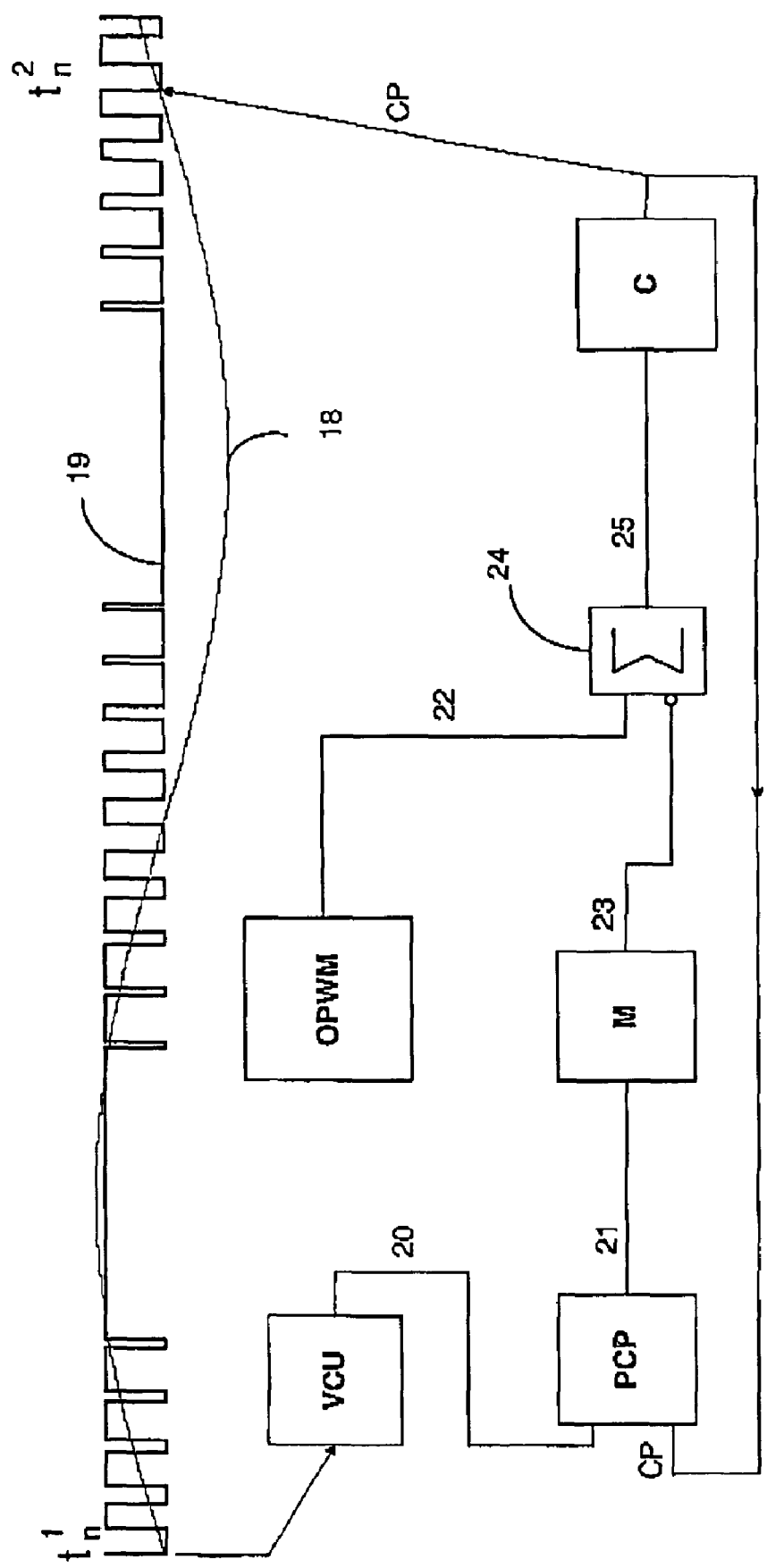
FIG. 9 is a block diagram of a first embodiment of a control method and an apparatus according the invention.

A general concept of a first embodiment of a control method and apparatus according to the invention is shown in FIG. 9. In this embodiment a Pulse Control Processor PCP is compensating for the delays that occur at a switching of a valve by using adaptive control. A drive unit comprising a valve control unit VCU is detecting the effected switching event of a pulse $t_n^1$ of a pulse train 19 for controlling a voltage source converter valve to form a fundamental frequency 18. A pulse signal 20 carrying this information is sent to a pulse control processor, PCP included in the control apparatus. The PCP also receives a control pulse CP representing the switching order that has been executed. The PCP calculates by comparison of the pulse signal 20 and the control pulse CP the reaction time for the pulse $t_n^1$, that is how long the delay was from the switch order that was sent to the effected switching event. The calculated reaction time 21 for every pulse in a period of the fundamental frequency is stored in a memory M.

A pulse width modulation controller represented by the block OPWM sends a pulse signal 22 representing the switching order dictated by the system control, that is, the ideal switching order. A signal 23 representing the calculated reaction time for a pulse $t_n^2$ is added by an adding means 24 to the order signal 22 to form a new order signal 25 that is aimed to effect the actual switching event at the instant of desire. The new order signal 25 is sent to a control pulse creator C for effecting a switching order for the next switching.

Normally the total control of a converter in HVDC application is divided in three major parts. Firstly there is the system control which controls the active power/DC voltage and reactive power/AC voltage as well as the AC current. The desired or ideal pulse is generated from the system control. Secondly there is the valve control, which corresponds to member 17 in FIG. 5. Thirdly there is the drive control unit, which corresponds to member 16 in FIG. 5.

Figure 10:
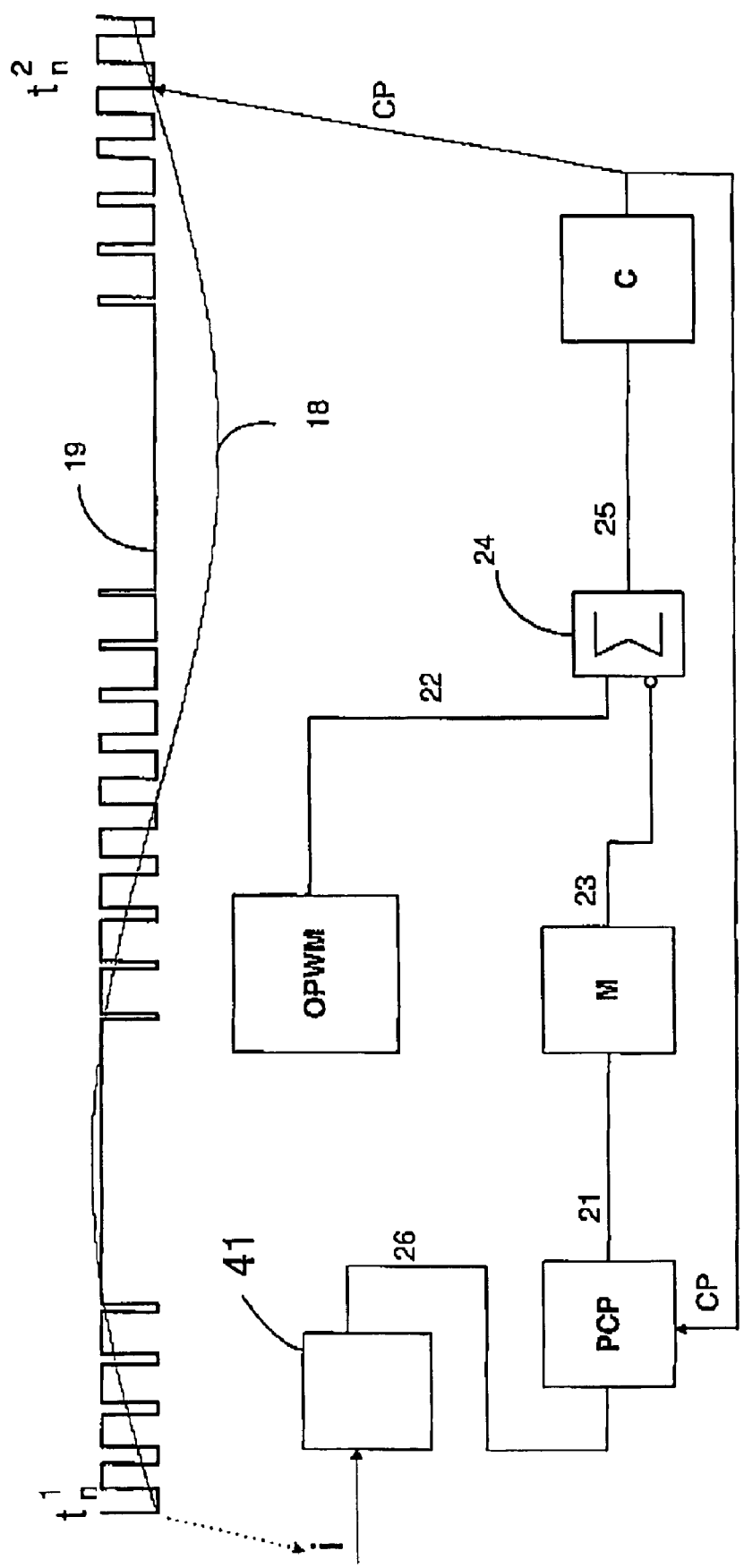
FIG. 10 is a block diagram of a second embodiment of a control method and an apparatus according the invention.

A general concept of a second embodiment of a control method and apparatus according to the invention is shown in FIG. 10. In this embodiment, the reaction time, which is represented by signal 26, for the pulse $t_n^1$ is evaluated by using the measured AC current and a function block 41, which has been described previously and shown in FIG. 8. The calculated reaction time 21 for every pulse in a period of the fundamental frequency is stored in a memory M. A signal 23 representing the calculated reaction time for a pulse $t_n^2$ is added by an adding means 24 to the order signal 22 to form a new order signal 25 that is aimed to affect the actual switching event at the instant of desire.

Although advantageous the invention must not be restricted to the embodiments given as an example. The main idea behind the invention is the use of information from one switching pulse in a first period of a harmonic period of a fundamental frequency to control the switching of an equivalent pulse in the next period. The determination of the effected switching event can thus be evaluated from either voltage measurements or from current measurements. Also other detail modifications will appear obvious to a person skilled in the art after study of the directives given herein. Such modifications are included in the scope of the present invention.

The invention claimed is:

1. An apparatus for controlling a voltage source converter with at least two bridges of semiconducting self commutating elements connected in anti-parallel with a diode, the apparatus comprising:
   means for producing a switching control pulse train to form a fundamental frequency,
   means for effecting a switching order and means for detecting a switching event,
   computer means for calculating a reaction time between a switching order and a switching event for a selected pulse of the pulse train, and
   means for adaptively adjusting the switch order of an equivalent pulse in a subsequent period of a harmonic period of the fundamental frequency utilizing the calculated reaction time.

2. The apparatus according to claim 1, wherein the means for adaptively compensating the switch order comprises a memory means for storing the calculated reaction times of each pulse of the harmonic period of the fundamental frequency.

3. The apparatus according to claim 1, wherein the means for detecting a switching event comprises means for measuring a voltage across electrodes of at least one semiconductor device in a valve.

4. The apparatus according to claim 1, wherein the means for producing a switching control pulse train comprises an optimum pulse width modulator.

5. The apparatus according to claim 1, wherein the computer means for calculating a reaction time comprises means for calculating a mean value for the reaction time of each pulse in the harmonic period of the fundamental frequency.

6. The apparatus according to claim 5, wherein the mean value comprises an exponential mean value.

7. A method for controlling a voltage source converter comprising at least two bridges including semiconducting self commutating elements, each connected in anti-parallel with a diode, and a control equipment, the method comprising:
   arranging a pulse train for forming a fundamental frequency, defining an instant to send a switching order of a pulse of the pulse train of the fundamental frequency,
   sending the switching order,
   determining the actual switching event,
   comparing the actual switching event with a desired switching event, and
   adjusting the instant to send the switching order of an equivalent pulse in a next harmonic period of the fundamental frequency based upon the comparing of the actual switching event and the ideal switching event.

8. The method according to claim 7, wherein the determination of the actual switching event comprises measurement of a voltage across electrodes of at least one of the semiconducting elements.

9. The method according to claim 7, wherein adjusting the instant to send the switching order of the equivalent pulse in the next harmonic period comprises a blanking time adjustment.

10. A method for controlling a voltage source converter by a pulse width modulation pulse signal comprising an ideal switching instant for each switching pulse, the method comprising:
   detecting an actual switching event for a selected switching pulse in a first period of a fundamental frequency,
   adjusting an action time for the selected switching pulse by comparison of the ideal switching instant and the actual switching event, and
   correcting a switching order of a corresponding pulse in a following period of the fundamental frequency utilizing the adjusted action time.

11. A computer program product, comprising:
   a computer readable medium; and
   computer program instructions recorded on the computer readable medium and executable by a processor for performing a method comprising arranging a pulse train for forming a fundamental frequency, defining an instant to send a switching order of a pulse of the pulse train of the fundamental frequency, sending the switching order, determining the actual switching event, comparing the actual switching event with a desired switching event, and adjusting the instant to send the switching order of an equivalent pulse in a next harmonic period of the fundamental frequency based upon the comparing of the actual switching event and the ideal switching event.

12. The computer program product according to claim 11, wherein the method further comprises providing the computer program instructions at least in part over a network.

13. The computer program product according to claim 11, wherein the method further comprises providing the computer program instructions at least in part over the Internet.

* * * * *